April 27, 1965  R. M. SHERRIE ETAL  3,180,281
CONTAINER SUPPORT AND LOCKING ARRANGEMENT
Filed April 23, 1962  11 Sheets-Sheet 4

INVENTORS
ROBERT M. SHERRIE
JACK E. GUTRIDGE by Cromwell, Greist & Warden
Attys.

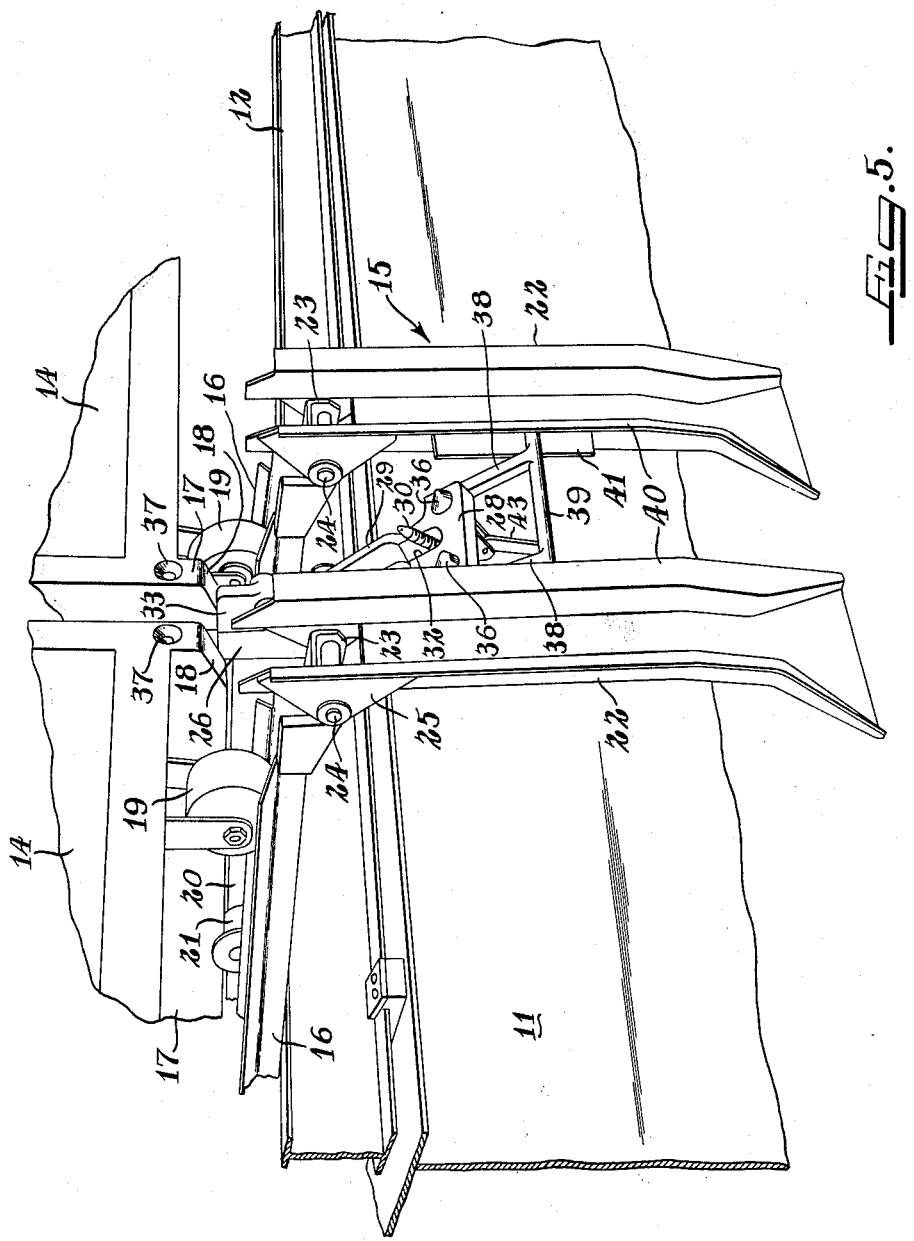

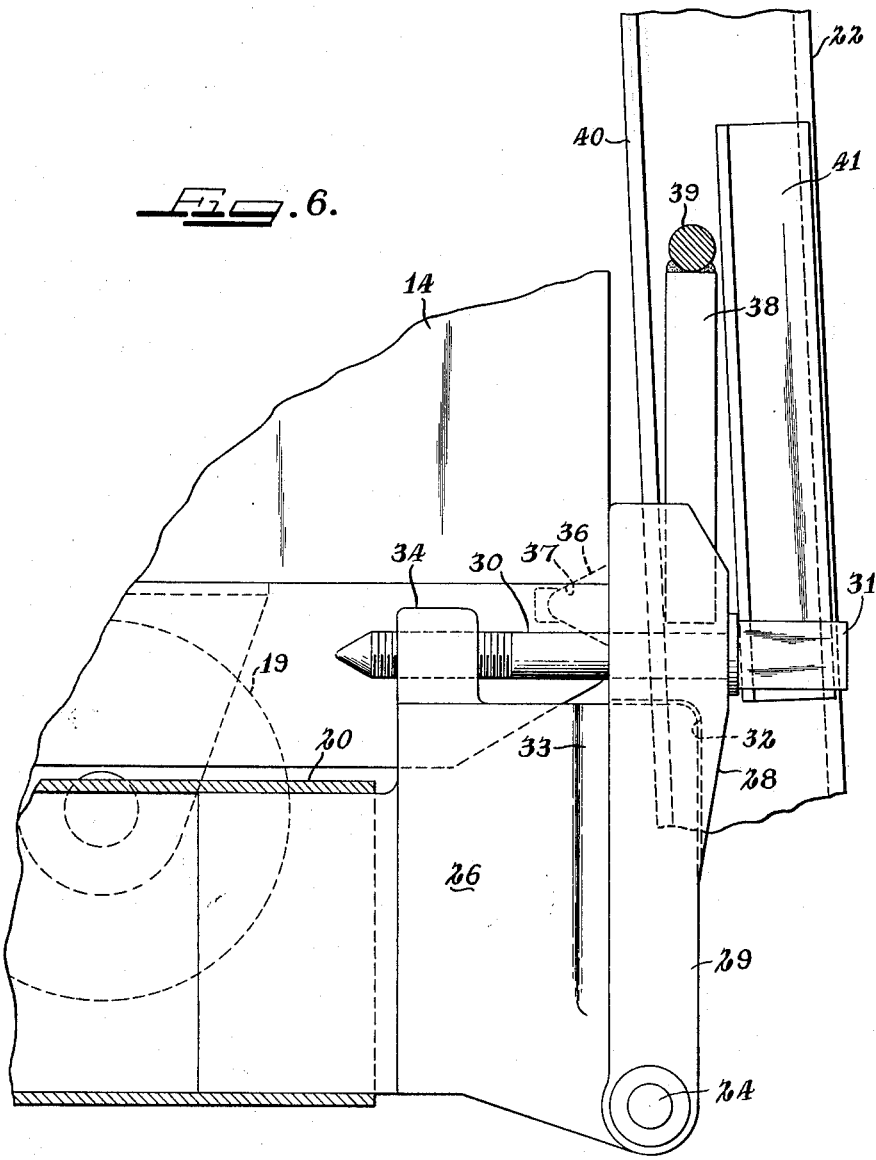

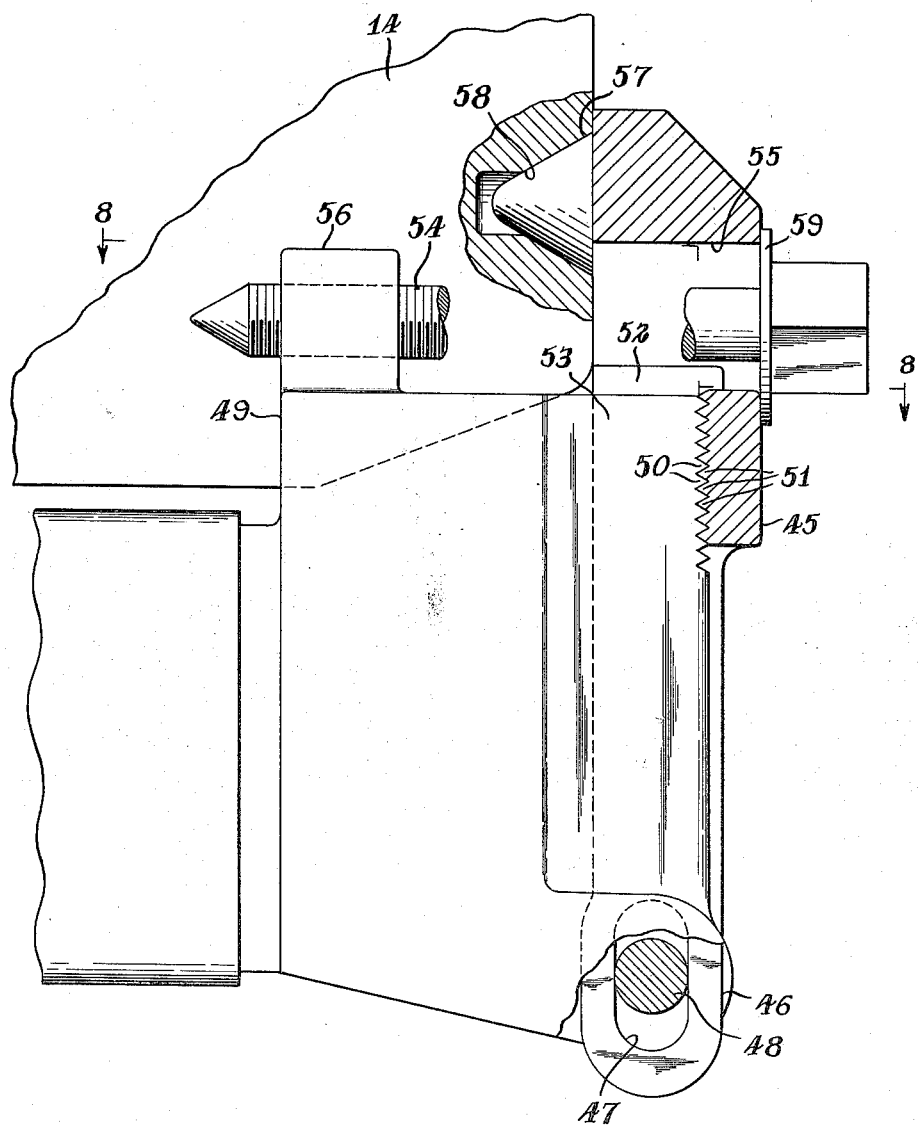

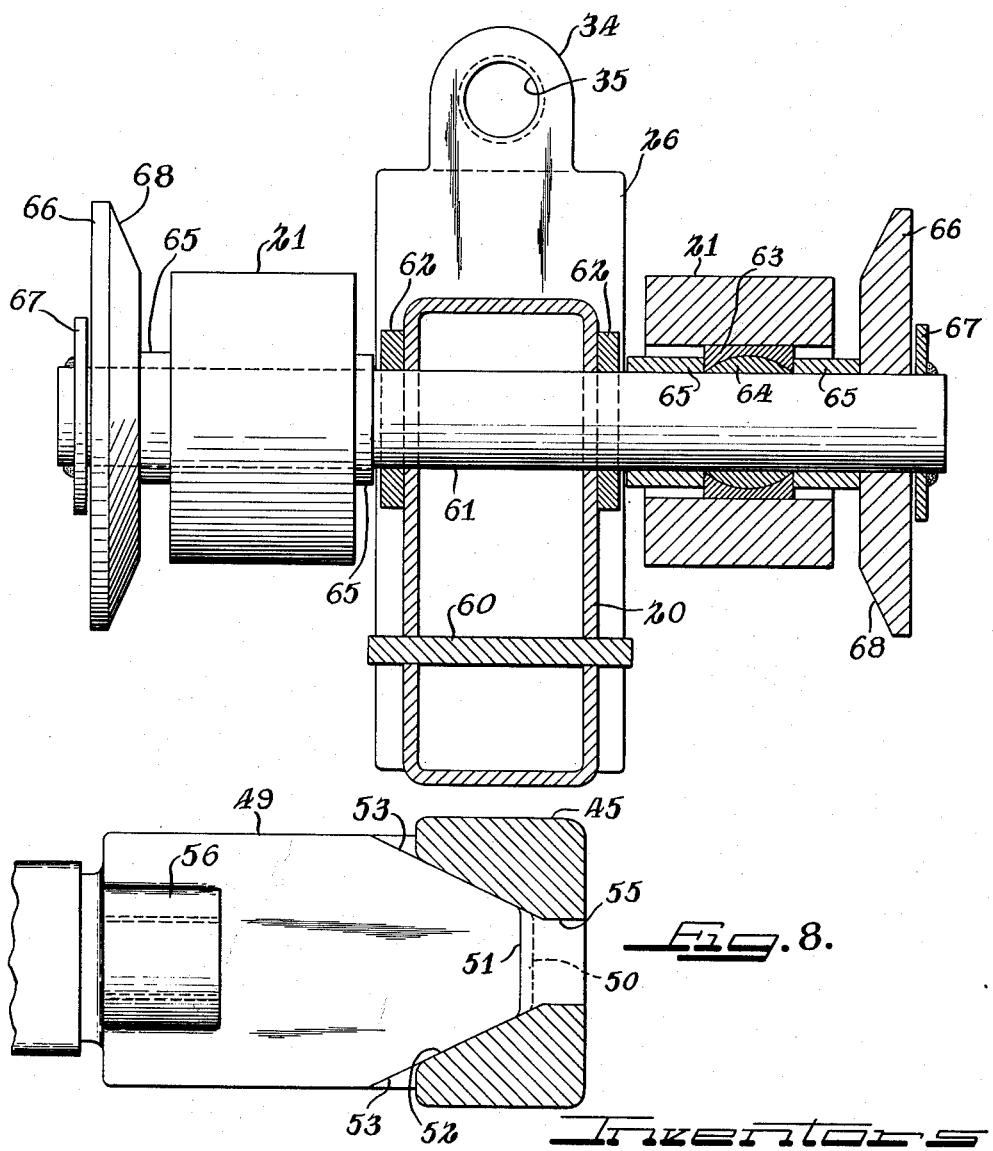

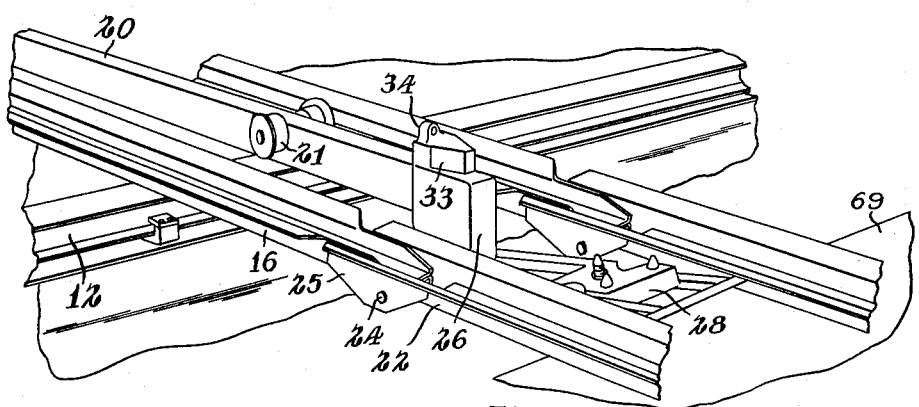
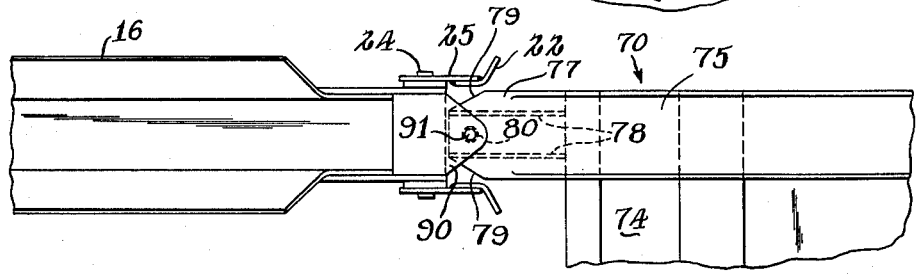
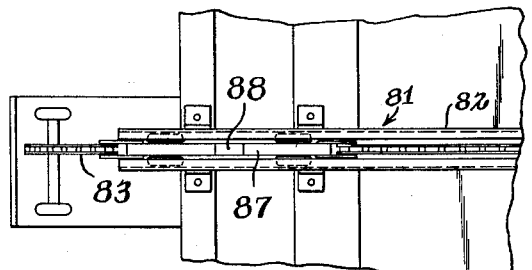
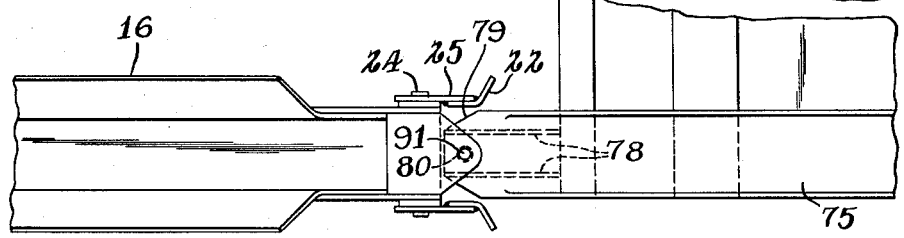

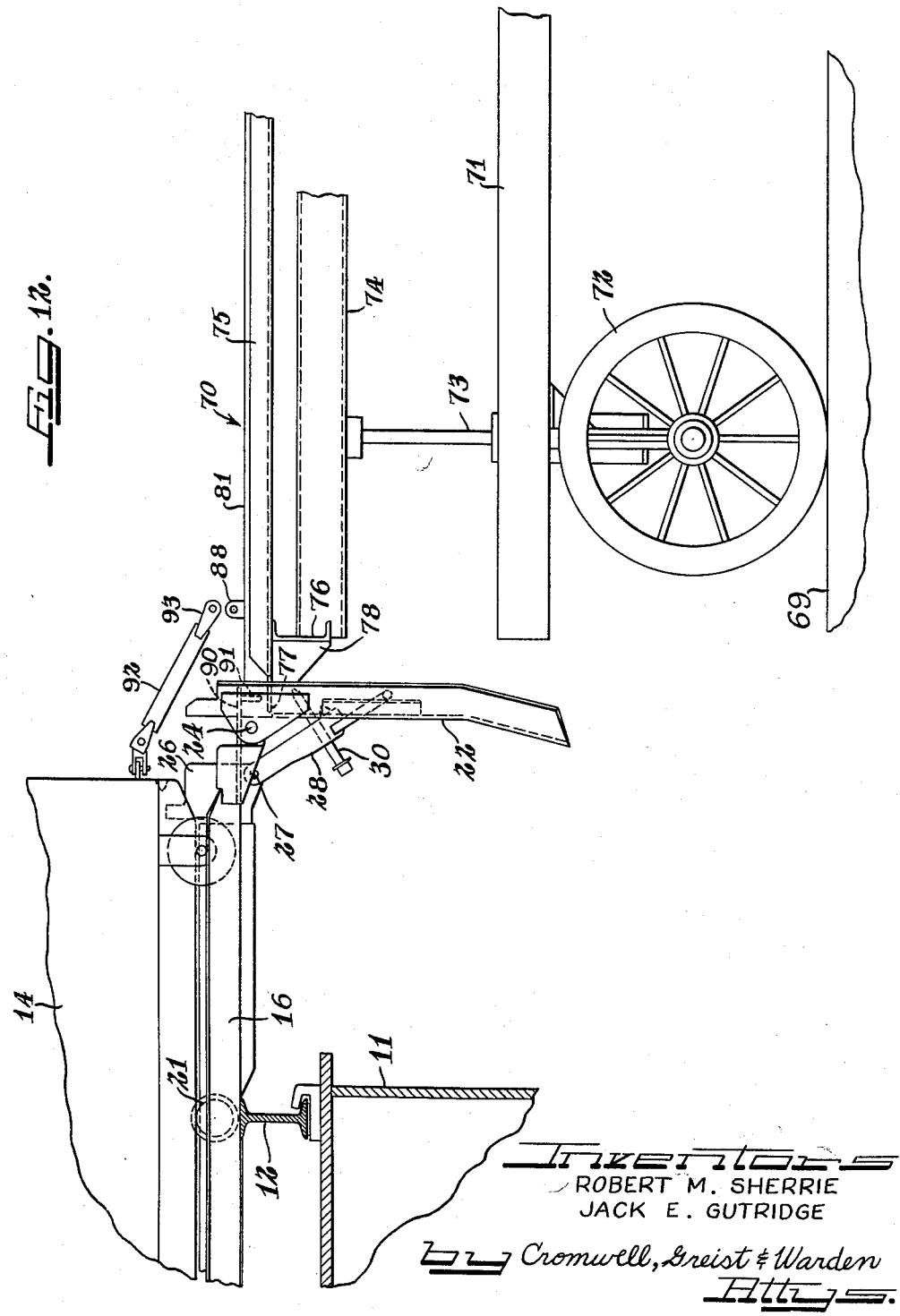

April 27, 1965 R. M. SHERRIE ETAL 3,180,281
CONTAINER SUPPORT AND LOCKING ARRANGEMENT
Filed April 23, 1962 11 Sheets-Sheet 11
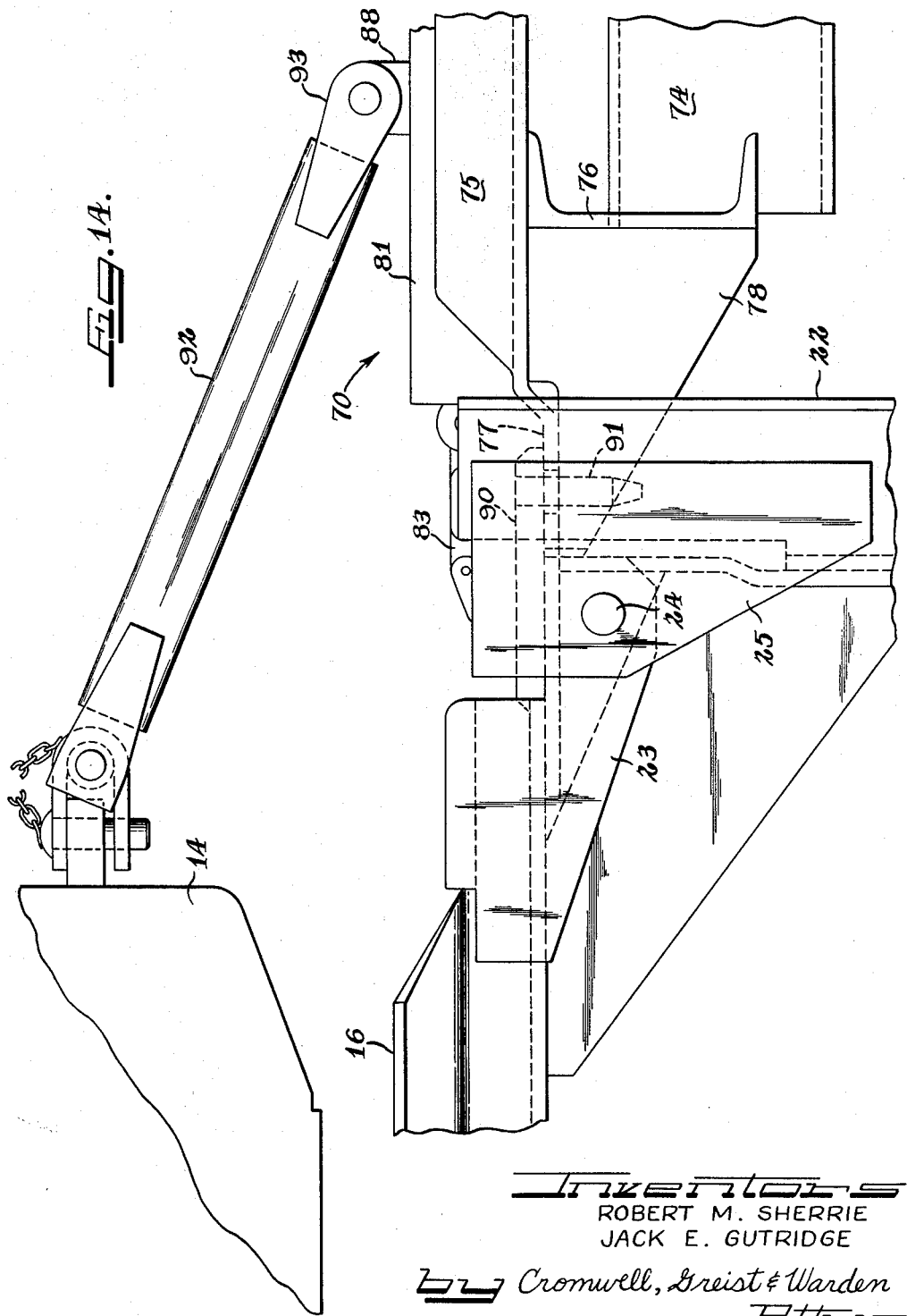
INVENTORS
ROBERT M. SHERRIE
JACK E. GUTRIDGE
by Cromwell, Greist & Warden
Attys.

United States Patent Office 3,180,281
Patented Apr. 27, 1965

3,180,281
CONTAINER SUPPORT AND LOCKING
ARRANGEMENT
Robert M. Sherrie, Lansing, Ill., and Jack E. Gutridge,
Dyer, Ind., assignors to Pullman Incorporated, Chicago,
Ill., a corporation of Delaware
Filed Apr. 23, 1962, Ser. No. 189,370
12 Claims. (Cl. 105—366)

The present invention is directed to a new and improved container support and lock assembly for use with a vehicle, such as a railway car, and also adapted for use with a container transfer means, such as a wheel-supported cart or the like used in transferring containers in freight and passenger depots.

It is an object of the invention to provide new and improved container support and lock means for mounting on a vehicle such as a railway car, the support and lock means being designed to accommodate container transfer to and from the vehicle while serving to hold the container on the vehicle in a new and improved manner during operation of the vehicle.

A further object is to provide a new and improved locking arrangement forming a part of a container support and lock assembly carried by a railway car or the like, the locking arrangement cooperating with a container and parts fixedly mounted on a vehicle to establish and maintain positive locking of the container on the vehicle against shifting or otherwise damaging movement.

Still another object is to provide a new and improved combination of a vehicle, container and container support and lock assembly wherein special elements are arranged in a new and improved manner for cooperative functioning to establish and maintain a positive locking of the container on the vehicle, the combination further permitting ready unlocking and transfer of a container to and from the vehicle.

Another object is to provide a new and improved container transfer and locking arrangement involving the combination of a vehicle, a container support and lock assembly and a container transfer means, the combination establishing new and improved cooperation between specific elements to provide for ready transfer of a container and additionally provide for positive new and improved locking of the container on the vehicle.

Still a further object is to provide a new and improved locking arrangement for mounting on a vehicle such as a railway car to lock a container thereon.

Other objects not specifically set forth will become apparent from the following detailed description of the invention made in conjunction with the accompanying drawings wherein:

FIG. 5 is a fragmentary perspective similar to FIG. 2 illustrating the container support and lock assembly in the unlocked condition for container transfer purposes;

FIG. 6 is an enlarged fragmentary section of the locking elements of the assembly as viewed generally along line 6—6 in FIG. 2;

FIG. 7 is a view similar to FIG. 6 illustrating a modified form of locking elements;

FIG. 8 is a transverse sectional view of the modified locking elements of FIG. 7 taken generally along line 8—8 therein;

FIG. 9 is an enlarged partial section of container support means forming a part of the assembly as viewed generally along line 9—9 in FIG. 3;

FIG. 10 is a fragmentary perspective of a portion of the assembly placed in operative use relative to a car unloading platform for container transfer therebetween;

FIG. 12 is a fragmentary elevation of the container support and lock assembly of the invention arranged in cooperative relation with a container transfer means for the loading and unloading of containers from the car;

FIG. 13 is a fragmentary plan view of the interconnected cooperating parts of the support and lock assembly and transfer means of FIG. 12;

FIG. 14 is an enlarged fragmentary elevation of the interconnection between cooperating ramp means of the transfer arrangement of FIGS. 12 and 13; and FIG. 15 is an enlarged fragmentary elevation of a container connecting member forming a part of drive means carried on the container transfer means for transfer of a container to and from the car.

Figure 1:
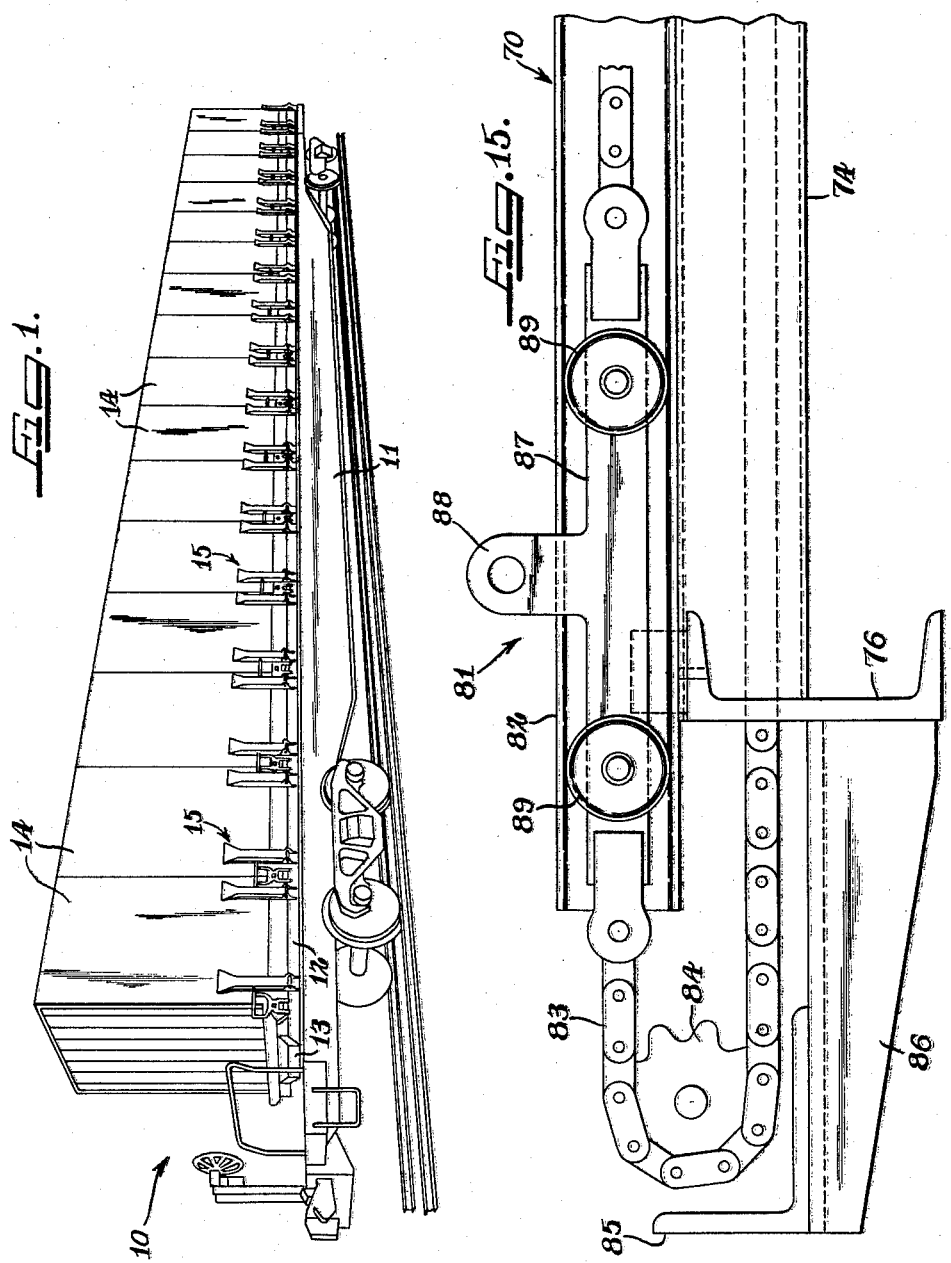
FIG. 1 is a perspective of a container railway car including thereon the new and improved container support and lock assembly of the invention.

The present invention deals with a specific arrangement whereby containers may be readily transferred between a supporting surface, such as a cart-type transfer means, to and from a vehicle such as a railway car with ease and with single continuous movement, the container in its supported position on the vehicle being positively held by locking means forming a part of the container transfer arrangement and operative to hold and engage the container in a new and improved manner. FIG. 1 illustrates a container car incorporating thereon the improved features of the invention. The car 10 includes a suitable underframe 11 preferably of open deck design, having mounted thereon a cushioned rack assembly of known type which generally comprises a pair of longitudinally extending, spaced rails 12 which are transversely interconnected, such as by transverse beams 13 at the ends thereof, and which are suitably connected through cushion devices (not shown) to the underframe 11 in the known manner. A series of containers 14 are mounted on the car 10 and are locked relative to the rail members 12 of the rack assembly by the container support and lock assemblies 15 of the invention. The containers 14 are arranged in close side-to-side relation thus permitting accommodation of a substantial number of containers on the car 10.

Figure 2:
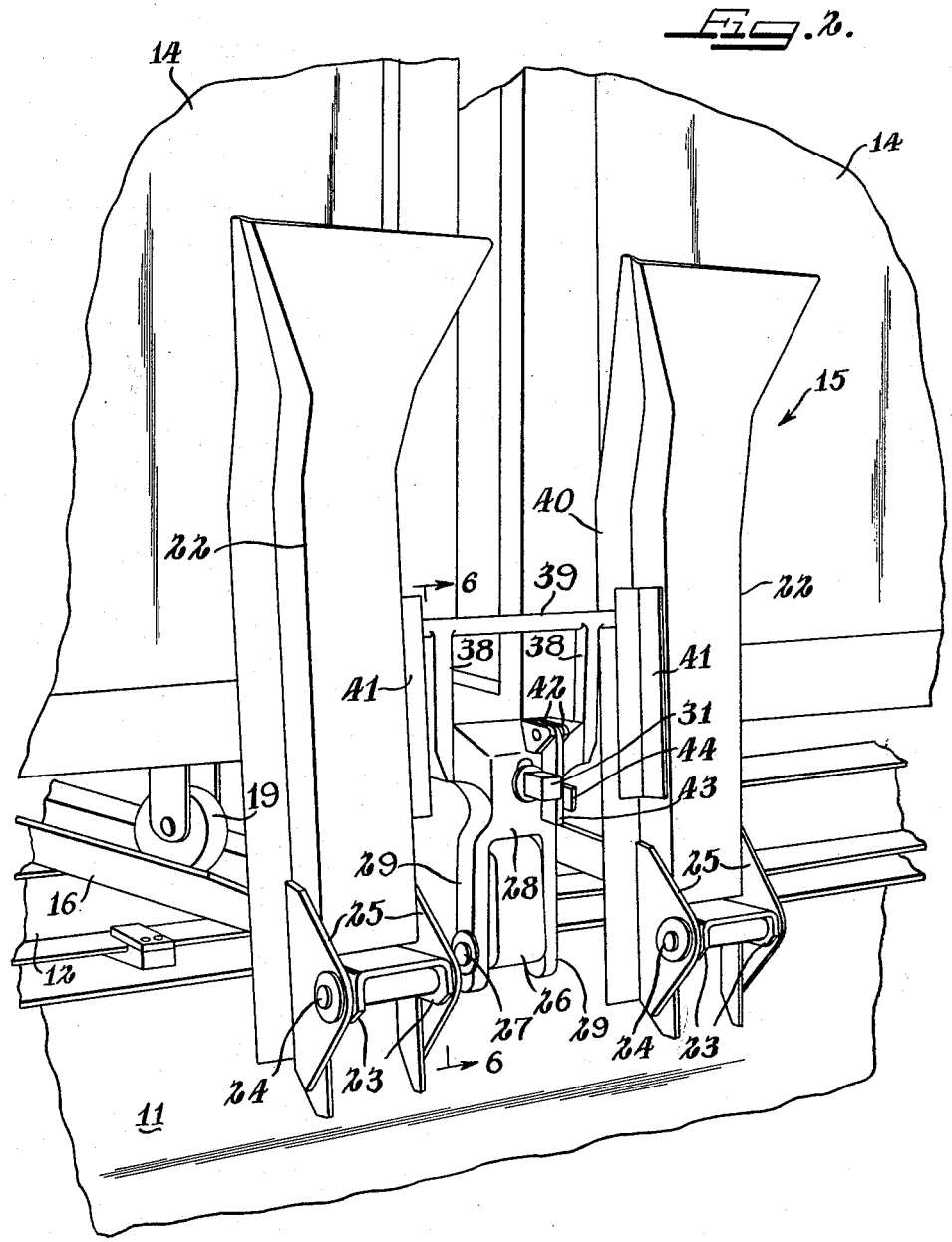
FIG. 2 is an enlarged fragmentary perspective of one end portion of the container support and lock assembly illustrating operative use thereof in locking containers on the car.
Figure 3:
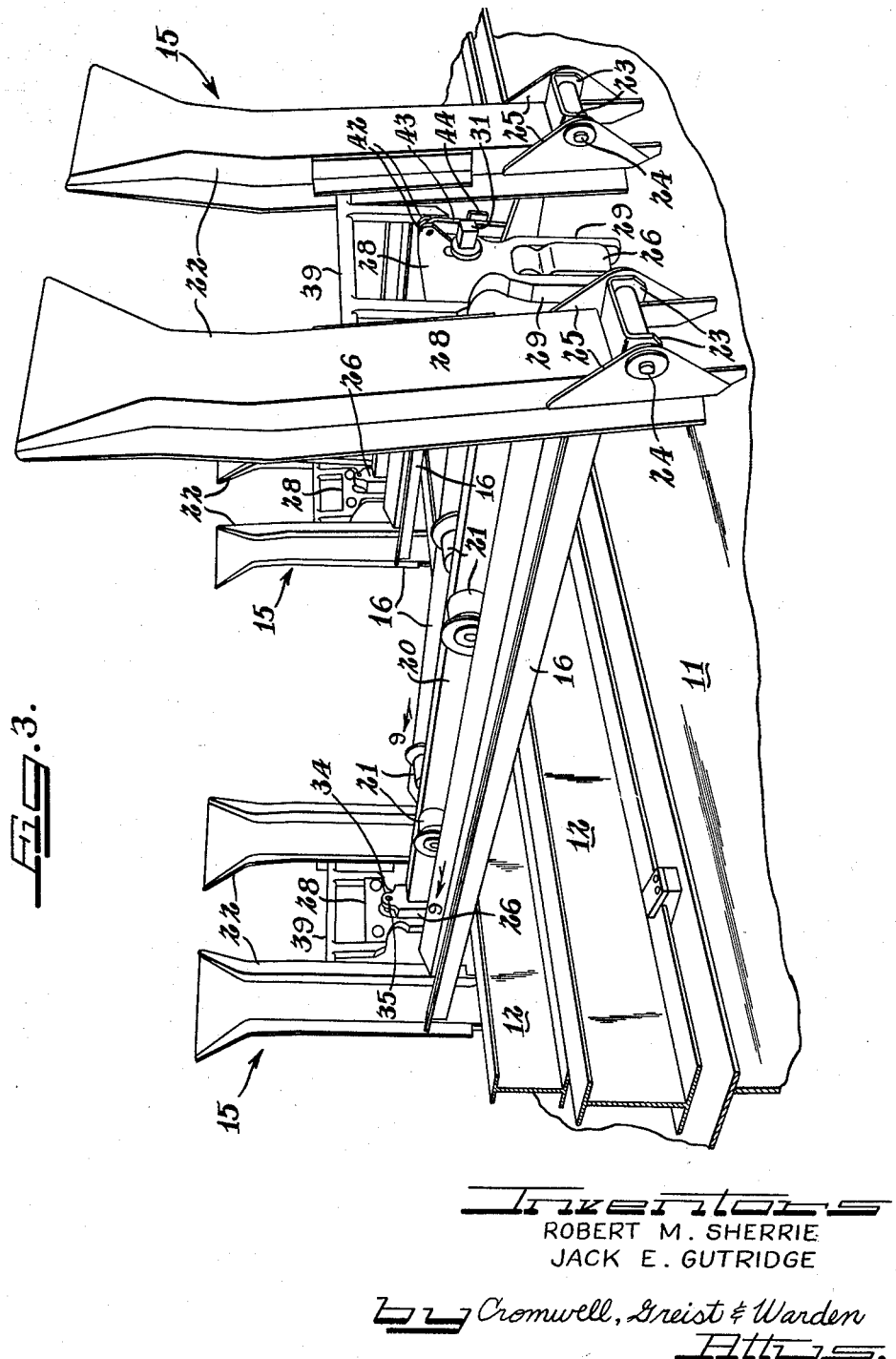
FIG. 3 is a fragmentary perspective of a portion of the container support and lock assembly mounted on the car and adapted to support and lock edge portions of adjacent containers.

FIGS. 2, 3 and 5 illustrate the container support and lock assemblies 15 as comprising a plurality of spaced parallel ramps 16 which are of upwardly opening channel-like shape and extend transversely across the rail members 12 of the rack assembly suitably fixed to the top flat surfaces thereof. The ramps 16 are preferably arranged in closely paired relation longitudinally of the car with one ramp of each pair being located just inwardly of a side wall of a container 14 as best shown in FIGS. 2 and 5. Each container 14 will preferably be formed with depending rail-like skid means 17 preferably located along opposite side margins thereof and preferably formed with beveled end surfaces 18. Just inwardly of the skid means the container is provided with caster assemblies 19 with the ramps 16 being arranged to receive and guide the same therein. The casters 19 at one end of the container 14 will preferably be pivotally mounted to permit controlled movement of the container thereon.

The shape of the ramps 16 provide for controlled guiding of pivotal casters therein during container transfer. Furthermore, the ramps 16 are formed with upwardly inclined side wing sections which aid in establishing proper alignment of the casters within the ramps.

The ramps 16 are located to receive the casters 19 of the containers 14 therein thus placing the skid means 17 of the containers outwardly along one side of the ramps. Intermediate each closely arranged pairs of ramps 16 a container support beam 20 is mounted transversely across the car 10 in fixed relation on top of the rail members 12. Each support beam 20 is provided with a plurality of spaced pairs of oppositely directed rollers 21 which are engaged by the skid means 17 of the containers.

Opposite ends of each of the ramps 16 have pivotally attached thereto bridge plates 22 which are preferably of channel-like shape formed at the outer ends thereof with outwardly enlarged caster-receiving portions which are slightly downwardly inclined relative to the main longitudinal portions of the bridge plates to present an inclined surface to readily receive containers rolled thereonto. The bottom flat section of each ramp 16 at each end thereof is formed with depending ear portions 23 receiving therethrough a pivot pin 24 and receiving thereabout depending ear portions 25 which are fixed to a bridge plate 22 and through which the pin 24 is received. The side wall portions of the bridge plates 22 project outwardly beyond the ear portions 25 to be received about the outer side wall surfaces of the ramps 16 to provide for side wall continuity when the bridge plates are aligned substantially longitudinally with the ramps. The bridge plates 22 are mounted for pivoting through an arc of approximately 180° from the extreme upright positions shown in FIG. 3 to the extreme downwardly hanging positions shown in FIG. 5.

The support beams 20 at each of the opposite ends thereof have fixed relative thereto a lock block 26 which through its outer bottom portion receives a pivot pin 27 therethrough (see FIG. 2) pivotally attaching thereto a bifurcated lock member 28. This lock member is in the form of a casting provided with depending leg portions 29 attached to the lock block 26 by the pin 27 and being snugly received about the bottom projecting portion of the lock block 26 when the lock member 28 is raised into its locking position as shown in FIG. 2. The main body portion of the lock member 28 includes a threaded locking pin 30 projecting therethrough and formed at the outer end thereof with a square head 31. The inner surface of the lock member 28, as best shown in FIG. 5, is formed with a recess 32 receiving therein the threaded inner end portion of the locking pin 30. As will be more fully described, the recess 32 is designed to snugly receive therein a wedge-shaped top outer edge portion 33 of the lock block 26 (FIG. 5) when the assembly is in its container locking position as shown in FIGS. 2 and 3.

As best shown in FIG. 6, the top surface of each lock block 26 has formed therewith an upwardly projecting, rearwardly positioned locking ear 34 provided with a threaded aperture 35 through which the locking pin 30 is received. The inner surface of the lock member 28 is further provided with a pair of spaced cone-like projections 36 (FIG. 5) which are arranged for alignment with corresponding recesses or detents 37 formed in the outer end surfaces of the container corners directly above the beveled end surfaces 18 of the skid means 17. The projections 36 are arranged to be received in the detents 37 of adjacent containers 14 thus locking adjacent sides of these containers through use of a single lock member 28.

The top portion of the lock member 28 is formed with a pair of upwardly directed arm-like members 38 which at their outermost ends are fixed to a transverse rod 39 projecting outwardly into engagement with paired bridge plates 22. The outermost ends of the rod 39 are received between the top side wall flange 40 of a bridge plate and an angle member 41 fixed to the adjacent side wall of the bridge plate along the outer surface thereof. Thus between the opposed surfaces of the top flange 40 and angle member 41 the projecting end of the rod 39 is confined in a slide area providing for interconnected pivotal movement of adjacent bridge plates 22 with the intermediate lock member 28 but permitting differences in relative pivoting about separate axes of rotation. Pivotal movement of either a bridge plate or lock member into and out of the extreme positions shown in FIGS. 3 and 5 will result in corresponding pivoting of the other related members. This interlocking arrangement further provides for retention of the paired bridge plates 22 in upright position when containers are locked on the car as shown in FIG. 2.

The operation of the various elements is best described in conjunction with FIGS. 2, 5 and 6. Briefly, following container loading such as illustrated in FIG. 5, the interconnected bridge plates 22 and lock member 28 may be pivoted into the upright positions of FIG. 2 and the lock pin 30 advanced into the locking ear 34 of the corresponding lock block 26 as shown in FIG. 6. An appropriate wrench or other tool is applied to the square head 31 of the lock pin 30 and during threaded advancement thereof the lock member 28 and associated bridge plates 22 are drawn tightly into their final locking position. During tightening of the lock member 28 to the lock block 26, the wedge-shaped portion 33 of the lock block will be tightly received in the recess 32 of the lock member 28 and the projecting cones 36 will be tightly received in the recesses 37 of the containers 14. Cooperative alignment and tightening of these various elements provide for controlled final positioning of the containers 14 on the car as well as controlled and final positioning of the bridge plates 22 in their raised positions. This locking arrangement tightly clamps all of the elements of the assembly relative to one another to readily accommodate both lateral and longitudinal operational forces applied to the elements during operation of the car 10. This is a positive locking arrangement which is readily established and which can be just as readily released.

The outer surface of the lock member 28 is formed with a pair of outwardly projecting ears 42 pivotally receiving therebetween a lock lever 43 which in its position of rest in the container locking condition of the assembly as shown in FIG. 2 hangs between a side edge of the square head 31 of the locking pin 30 and an outwardly directed rigid plate 44. In this manner inadvertent retraction of the locking pin is prevented during operation of the car. For container unlocking, it is necessary merely to raise the lever 43 for ready tool engagement with the locking pin 30.

Figure 4:
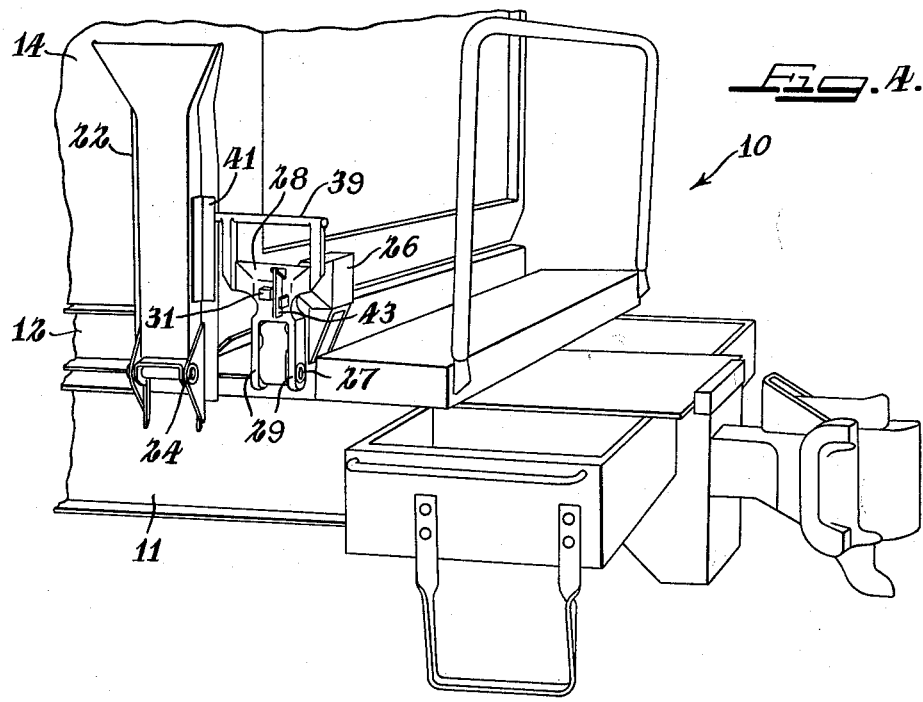
FIG. 4 is a fragmentary perspective of a container support and lock assembly at one end of the car.

FIG. 4 illustrates a modified locking arrangement at opposite ends of the car 10. It will be appreciated that at the ends of the car it is necessary merely to lock one end portion of a container 14. The assembly is the same in structural arrangement and operation as described above with the exception that the rod 39 of the lock member 28 may have its outermost projecting end removed as this end does not engage a bridge plate 22.

FIG. 6 illustrates in detail the locking arrangement established between the lock member 28, the lock block 26 and a container 14. It will be particularly noted that the lock pin 30 is advanced substantially through the locking ear 34 and the wedge-shaped portion 33 of the lock block 26 is substantially and tightly received in the correspondingly shaped recess 32 of the lock member 28. Similarly the cone projections 36 are snugly received in the recesses 37 of the container 14 thus tightly interconnecting the container 14 through the lock member 28 and lock block 26 on the support beam 20 of the car.

FIGS. 7 and 8 illustrate a modified form of lock member 45 which basically is of the same design as the lock member 28 but additionally includes adjustment features. The bifurcated leg portions 46 of the lock member 45 are formed with elongated slots 47 which receive the pin 48 attaching the lock member 45 to a slightly modified lock block 49. An outer face portion of the lock block 49 is formed with a plurality of vertically arranged serrations 50 which in turn engage corresponding serrations 51 formed in the interior of the lock member 45 at the inner end portion of the recess 52 thereof in which the wedge-shaped portion 53 of the lock block 49 is received. A lock pin 54 of the type previously described is received through a suitable aperture 55 in the lock member 45 and is threadedly engaged through a locking ear 56 formed on the top rear surface of the lock block 49. The lock member 45 also includes the projecting cones 57 received in corresponding recesses 58 in a container 14. The aperture 55 through which the lock pin 54 extends is of substantially greater diameter than the pin to permit limited universal movement of the pin therein for ready alignment with the locking ear 53 during operation of the assembly. A radial collar 59 is formed on the lock pin 54 and overextends the outer surface of the lock member 45 to hold the pin in operative position.

Upon raising the lock member 45 and associated bridge plates 22 in the manner previously described, the lock member 45 may be shifted in a vertical direction to any extent desired in order to establish proper alignment between the lock pin 54 and the locking ear 56 as well as the projecting cones 57 and the container recesses 58. Vertical shifting is made possible by reason of the elongated slot 47 through which the pivot pin 48 is received. Furthermore, the locking pin 54 may be rocked in its aperture 55 for proper alignment with the locking ear 56. Upon the obtaining of proper alignment between the various cooperating parts, subsequent tightening of the locking pin 54 will result in engagement between the serrations 50 and 51 to an extent that the lock member 45 is positively fixed relative to the lock block 49. In this manner any subsequent vertical shifting of the lock member 45 is prevented.

FIG. 9 illustrates the details of the container support means of the assembly including the transverse support beam 20 and rollers 21. The support beam 20 may be in the form of a hollow rectangular housing formed from structurally combined plate sections including a transverse reinforcing plate portion 60. As previously described, the support beam 20 is fixed along its bottom surface to the top surfaces of the rail members 12 of the car. The rollers 21 are mounted on pins 61 extending through the beam 20 and fixed thereto by end plates 62. Each roller 21 includes a concave bearing member 63 fixed to the inner surface thereof and in engagement with a convex bearing surface 64 fixed on the pin 61. Spacer sleeves 65 establish and maintain proper positioning of the rollers. The outer ends of the pin 61 have received thereon guide flanges 66 which are retained on the pins by fixed washers 67. The guide flanges 66 project radially outwardly beyond the rollers 21 and are formed with an annular inclined surface 68 against which a container skid means 17 may bear during loading and unloading of containers. As best shown in FIGS. 3 and 5, the rollers 21 project above the ramps 16 and are positioned relative to the ramps to receive thereon the skid means 17.

Figure 11:
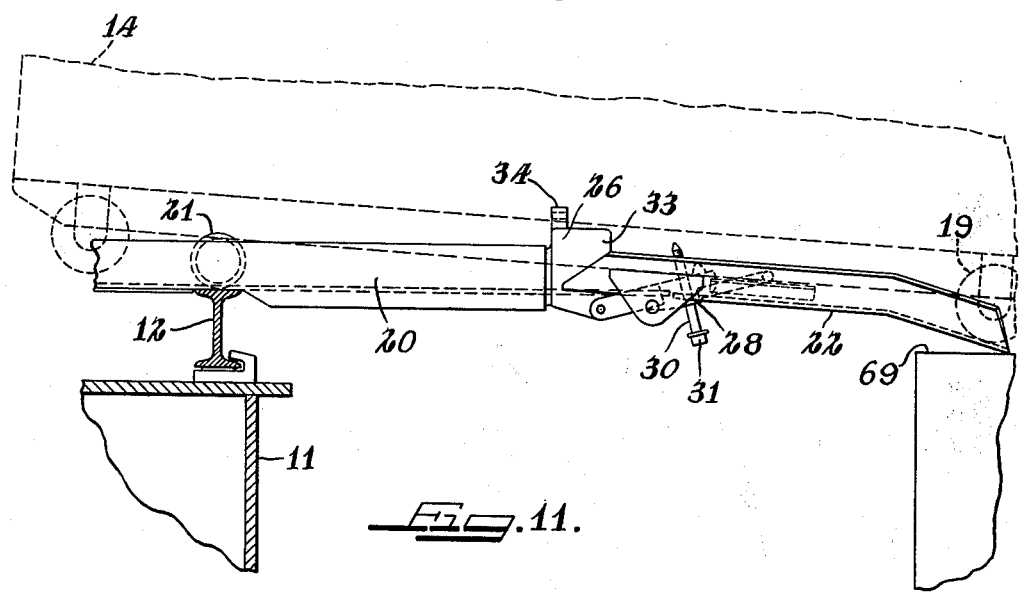
FIG. 11 is a fragmentary elevation of the transfer arrangement of FIG. 10 illustrating in phantom the transfer of a container between the car and a platform.

Loading of a container onto the car will be described in connection with the use of the bridge plates 22 in spanning the distance between the car and a platform surface 69 illustrated in FIGS. 10 and 11. The bridge plates 22 are placed in generally horizontal positions thus constituting outward extensions of the ramps 16 associated therewith and the outer ends of the bridge plates are placed in resting engagement on the platform surface 69. A container 14 is rolled along its casters 19 onto the bridge plates 22 and ultimately onto the ramps 16. Upon adequate advancement of a container onto the ramps 16, the beveled end surfaces 18 of the skid means 17 engage the first of the rollers 21 carried by the transverse beam 20. The container is then lifted along the rollers 21 as illustrated in FIG. 11 to an extent that the leading casters 19 are raised out of engagement with the ramps 16. Ultimately, the container 14 will be fully supported on the rollers 21 with the casters 19 thereof spaced in vertically raised position out of engagement with the ramps 16. With regard to the wedge-shaped portion 33 of each lock block 26, the inclined surfaces supplied thereby will also aid in guiding the container onto the car during loading thereof. The skid means 17 of a container will slide along the inclined surface of the wedge-shaped portion to be guided thereby toward the rollers 21.

With the foregoing arrangement, the rollers 21 carried by the car may be in the form of heavy duty rollers designed to perform a specific function and by reasons of car mounting are protected against damage arising from general container handling in a freight or passenger depot. The casters 19 of the containers 14 may be of any suitable type capable of generally supporting the container load during ordinary transfer thereof but preferably generally incapable of supporting the container load with the requisite stability during transportation of the container on a railway car. While heavy duty casters may be used thus providing for ramp support of the container at all times, preferably the dead weight of the container transmitted through the strong frame thereof is transferred directly to the car through the aforementioned specially arranged elements forming a part of the car assembly. Container unloading is brought about by reversing the procedure described above and results in the container tilting to a limited extent until the lead casters thereof engage the ramps and bridge plates to transfer the container load onto the casters.

FIG. 12 illustrates a special transfer arrangement of the present invention involving the container support and lock assembly described above and a standard container transfer means in the form of a platform cart 70 modified in certain respects to cooperate with the container support and lock assembly in a special manner. The cart 70 is not illustrated in detail as the same is generally well known. Basically, such a cart includes a frame 71 which is supported by axle and wheel assemblies 72 and which has mounted thereon hydraulic cylinder means 73 attaching thereto a vertically movable container support platform 74. FIG. 13 illustrates the platform 74 as generally comprising container track means 75 which extend longitudinally along the platform in spaced relation adjacent outer side edges thereof. The ends of the track means 75 project beyond the transverse end frame member 76 of the platform 74 and are provided with integrally formed ramp engaging means in the form of tongues 77. Suitable bracing plates 78 are attached to the undersurface of each tongue 77 and are fixed to the transverse end frame member 76. The tongues at their outer ends are formed with side surface bevel portions 79 and a central aperture 80.

Centrally of the cart platform 74 is a longitudinal extending container drive means 81 formed from a top slotted housing 82 receiving therethrough a continuous drive chain 83 suitably received about an idler sprocket 84 mounted on a transverse plate 85 projecting outwardly beyond the transverse end frame member 76 and supported by bottom surface web plates 86 (FIGS. 13 and 15). A drive sprocket (not shown) is at the opposite end of the platform 74 and has attached thereto suitable drive means whereby the chain 83 can be advanced between the sprockets. The top portion of the chain 83 extends through the housing 82 and the bottom return portion thereof extends through a suitable opening in the transverse end frame member 76 under the top surface of the platform 74 to the opposite end drive sprocket.

The chain 83 has as a part thereof a container connecting member 87 which is best illustrated in FIG. 15. This connecting member includes a body portion of elongated configuration received within the housing 82 and provided with an upward projecting attachment ear 88 which extends through the slot in the top surface of the housing 82. Opposite ends of the body portion of the connecting member 87 are supported in the housing 82 by rollers 89. The rollers are spaced toward opposite ends of the body portion to provide stabilized movement of the connecting member during container movement onto the platform 74. Opposite ends of the body portion of the connecting member 87 are suitably attached to the chain 83.

FIG. 13 best illustrates the provision of projecting tongues 90 on the ends of the ramps 16. These tongues project outwardly beyond the pivotal attachment of the bridge plates to the ramps 16 as defined by the pins 24. Appropriate recessing of the adjacent edges of the bottom plate portions of the associated bridge plates 22 readily accommodates the projecting tongues 90 of the ramps whenever the bridge plates are to be utilized in the manner illustrated in FIGS. 10 and 11 and when the bridge plates 22 are raised into their upright locking position. The tongues 90 are formed with depending pins 91 which are dimensioned to be received through the apertures 80 of corresponding tongues 77 of the cart 70 previously described.

Referring particularly to FIGS. 12 and 14, during use of the cart 70 in unloading a container 14 from the car 10, the container is first unlocked and the bridge plates 22 pivoted downwardly into their depending position. This position of the bridge plates presents a vertical guide in which the tongues 77 of the transfer cart 70 are readily received as illustrated in FIG. 13. The bridge plates provide a vertical guide track with their outwardly inclined side wall sections 40 presenting guide surfaces in a vertical direction to readily cooperate with the beveled edges 79 of the tongues 77 of the cart 70. Thus the cart may be advanced toward the car until the tongues 77 are aligned in the vertically directed bridge plates, this alignment occurring while the vertically movable platform 74 is in a lowered position. Upon proper alignment, the platform 74 is then moved upwardly and the cart retains its alignment with the bridge plates by reason of the tongues 74 sliding upwardly within the outwardly opening channel sections of the bridge plates. Ultimately, the depending pins 91 of the tongues 90 of the ramps 16 will be automatically received through the apertures 80 in the tongues 77 of the cart and complete inseparable attachment between the railway car and transfer cart is obtained.

This complete attachment is illustrated in FIGS. 12 and 14 and it will be appreciated that the cart is fixed relative to the railway car thus eliminating any possibility of inadvertent separation during container transfer. Each container 14 is provided with a tow bar 92 of any suitable type formed with a bifurcated connecting member 93 at the outer end thereof which is pin-connected to the attachment ear 88 of the connecting member 87 of the cart. The drive means of the cart is then operated and the container connecting member 81 moves smoothly within the housing 82 toward the opposite end of the cart and the container is drawn onto the platform 74 of the cart. As the container 14 begins to leave the endmost rollers 21 and tilts to bring its leading casters 19 into engagement with the ramps 16, the casters will automatically be guided by the raised side edges of the ramps 16 and interconnected tracks 75 on the cart. In this regard the outwardly projecting side wall portions of the bridge plates 22 previously described will project upwardly along the sides of the tongues 77 and 90 to maintain continuity of guide surfaces for the pivotal casters 19 of a container.

The arrangement described above is of course fully useful during loading of a container from the transfer cart 70 onto the car 10. Following the loading or unloading operation, it is necessary merely to lower the platform 74 sufficiently to disengage the locking pins 91 from the apertures 80 of the tongues 77 at which point the cart is completely free from the car 10 and may be moved away with the container thereon.

Obviously certain modifications and variations of the invention as hereinbefore set forth may be made without departing from the spirit and scope thereof, and therefore only such limitations should be imposed as are indicated in the appended claims.

We claim:

1. A container support and lock assembly for mounting on a vehicle, said assembly comprising a pair of spaced parallel ramps for fixed mounting on a vehicle transversely thereof to support adjacent end portions of a pair of containers during movement of containers onto and from a vehicle, a bridge plate pivotally mounted at each end of each of said ramps, means for pivoting each bridge plate through an arc of about 180° in a direction longitudinally of said ramps into and out of a substantially upright position relative to the ends of said ramps, container lock means carried by said bridge plates between the same for movement therewith, and lock elements fixed between said ramps and aligned with said lock means for releasable engagement therewith when said bridge plates are in an upright position to confine a container on said ramps.

2. A container support and lock assembly for mounting on a vehicle, said assembly comprising a pair of spaced parallel ramps for fixed mounting on a vehicle transversely thereof to support adjacent end portions of a pair of containers during movement of containers onto and from a vehicle, a bridge plate pivotally mounted at each end of each of said ramps, means for pivoting each bridge plate through an arc of about 180° in a direction longitudinally of said ramps into and out of a substantially upright position relative to the ends of said ramps, container guide means between said ramps, container support elements spaced longitudinally along said guide means and relative to said ramps to receive a bottom surface portion of adjacent containers thereon, said support elements projecting above said ramps to support a container in spaced relation thereto and out of supported engagement therewith, container lock means pivotally mounted on said guide means and engaged by said bridge plates between the same for movement therewith, and lock elements fixed between said ramps on said guide means and aligned with said lock means for releasable engagement therewith when said bridge plates are in an upright position, said lock means including container engaging means to hold a container on said support elements for locking thereof.

3. The assembly of claim 2 wherein said container engaging means is in the form of a cone-shaped projection to be received in a container recess.

4. The assembly of claim 2 wherein said container guide means is provided with end portions projecting above said ramps and presenting a wedge-shaped portion outwardly between said bridge plates to guide a container along said ramps, each lock means including a recess in a face portion thereof which receives a wedge-shaped portion therein upon container locking, said container engaging means being in the form of a cone-shaped projection to be received in a container recess.

5. In combination, a vehicle, a container support and lock assembly, and a container transfer means, said container support and lock assembly being mounted on said vehicle and comprising a plurality of parallel ramps extending transversely of said vehicle and arranged in paired relation with each pair being longitudinally spaced for support of adjacent ends of adjacent containers, a bridge plate pivotally mounted at each end of each of said ramps, means for pivoting said bridge plates through an arc of greater than 90° into and out of a substantially upright position relative to the ends of said ramps and in a direction longitudinally thereof, container lock means between said bridge plates and operative to lock said bridge plates in upright position along end portion side surfaces of adjacent containers and hold containers on said vehicle, the ends of said ramps associated with said bridge plates including attachment means which project outwardly beyond said bridge plates when the same are pivoted downwardly beyond at least 90° from an upright position, said container transfer means comprising a vertically adjustable container support platform provided along an edge thereof with projecting ramp engaging means releasably connected to said attachment means to hold said container transfer means relative to said vehicle for container transfer therebetween.

6. The combination of claim 5 wherein said bridge plates are pivoted about 180° from an upright position into a vertical depending position and are provided with longitudinal guide means which project outwardly and are engaging said ramp engaging means to center the same, said attachment means horizontally overlapping said ramp engaging means and provided with depending pin means received through aligned apertures in said ramp engaging means to lock said transfer means to said vehicle.

7. In a vehicle supporting a container thereon and including a pivotally mounted block assembly engaging said container to lock the same on said vehicle, the improvement comprising said vehicle including a fixedly mounted locking block having a wedge portion and provided with a series of serrations formed in a face portion thereof, said lock assembly including a recess therein shaped to cooperatively receive the wedge portion of said locking block, and a series of serrations formed in a face portion of said lock assembly to engage said serrations in said locking block, the pivotal connection of said lock assembly including adjustment means to permit vertical movement of said lock assembly and proper alignment between said lock assembly, container and locking block by selective serration engagement.

8. The vehicle of claim 7 wherein said lock assembly further includes at least one cone-like projection for engagement with detent means forming a part of said container.

9. In combination, a vehicle, a plurality of containers on said vehicle in spaced end-to-end relation, and a container support and lock assembly operative with the end portions of adjacent containers, each container support and lock assembly being mounted on said vehicle and comprising a pair of spaced parallel ramps extending transversely of said vehicle with each ramp supporting an end portion of a container, a bridge plate pivotally mounted at each end of each of said ramps, container lock means forming a part of and operatively engaged by adjacent bridge plates and located between the same for pivotal movement therewith at each end of said ramps, said bridge plates in container locking position being in an upright position relative to the ends of said ramps and overlying adjacent end portion side surfaces of adjacent containers, and lock elements mounted on said vehicle between each pair of ramps in association with each end thereof and releasably engaging the lock means of adjacent bridge plates, said bridge plates being movable at least to a generally outwardly projecting horizontal position to support containers during movement thereof to and from said vehicle.

10. The combination of claim 9 wherein said vehicle includes container support elements between said ramps and projecting above the same, each container comprising depending rail-like means and caster means mounted to one side of said rail-like means, each container being supported on said support element with said rail-like means in engagement therewith and with said caster means positioned over said ramps in vertically spaced relation thereto.

11. In combination, a vehicle, a plurality of containers on said vehicle in spaced end-to-end relation, and a container support and lock assembly operative with the end portions of adjacent containers, each container support and lock assembly being mounted on said vehicle and comprising a pair of spaced parallel ramps extending transversely of said vehicle with each ramp supporting an end portion of a container, a bridge plate pivotally mounted at each end of each of said ramps, container lock means forming a part of and operatively engaged by adjacent bridge plates and located between the same for pivotal movement therewith at each end of said ramps, said bridge plates in container locking position being in an upright position relative to the ends of said ramps and overlying adjacent end portion side surfaces of adjacent containers, and lock elements mounted on said vehicle between each pair of ramps in association with each end thereof and releasably engaging the lock means of adjacent bridge plates, said bridge plates being movable at least to a generally outwardly projecting horizontal position to support containers during movement thereof to and from said vehicle, said lock means including container engaging means co-operating with detent means forming a part of each adjacent container.

12. In combination, a vehicle, a plurality of containers on said vehicle in spaced end-to-end relation, and a container support and lock assembly operative with the end portions of adjacent containers, each container support and lock assembly being mounted on said vehicle and comprising a pair of spaced parallel ramps extending transversely of said vehicle with each ramp supporting an end portion of a container, a bridge plate pivotally mounted at each end of each of said ramps, container lock means forming a part of and operatively engaged by adjacent bridge plates and located between the same for pivotal movement therewith at each end of said ramps, said bridge plates in container locking position being in an upright position relative to the ends of said ramps and overlying adjacent end portion side surfaces of adjacent containers, and lock elements mounted on said vehicle between each pair of ramps in association with each end thereof and releasably engaging the lock means of adjacent bridge plates, said bridge plates being movable at least to a generally outwardly projecting horizontal position to support containers during movement thereof to and from said vehicle, said lock means and lock elements including co-operating wedge means and wedge engaging means which in mutual engagement assist in final and rigid positioning of the containers on said vehicle.

References Cited by the Examiner
UNITED STATES PATENTS

| | | | |
|---|---|---|---|
| 1,418,966 | 6/22 | Perin | 105—366 |
| 1,845,593 | 2/32 | Fildes | 105—366 |
| 1,853,594 | 4/32 | Woodruff | 105—366 |
| 1,860,747 | 5/32 | McLaughlin | 105—366 |
| 1,923,785 | 8/33 | Holan | 296—35 |
| 2,021,503 | 11/35 | Fildes | 105—366 |
| 2,036,336 | 4/36 | Kellett | 105—366 |
| 2,266,790 | 12/41 | Norbom | 296—35 |
| 2,631,885 | 3/53 | Ault | 105—366 |

LEO QUACKENBUSH, *Primary Examiner.*

UNITED STATES PATENT OFFICE
CERTIFICATE OF CORRECTION

Patent No. 3,180,281　　　　　　　　　　　　　　April 27, 1965

Robert M. Sherrie et al.

It is hereby certified that error appears in the above numbered patent requiring correction and that the said Letters Patent should read as corrected below.

Column 6, line 16, for "reasons" read -- reason --; column 7, line 2, for "upward" read -- upwardly --; column 9, line 20, for "block" read -- lock --; column 10, after line 59, insert the following reference:

2,071,620　　2/37　　Fitch----------105-366

Signed and sealed this 28th day of September 1965.

(SEAL)
Attest:

ERNEST W. SWIDER　　　　　　　　　　　　　　EDWARD J. BRENNER
Attesting Officer　　　　　　　　　　　　　　Commissioner of Patents